United States Patent [19]

Chen

[11] Patent Number: 5,305,984
[45] Date of Patent: Apr. 26, 1994

[54] FAUCET ASSEMBLY

[76] Inventor: Kun-Yang Chen, Suite 1, 11F, 95-8 Chang Ping Road Sec. 1, Taichung, Taiwan

[21] Appl. No.: 3,838

[22] Filed: Jan. 11, 1993

Related U.S. Application Data

[63] Continuation-in-part of Ser. No. 819,486, Jan. 10, 1992, abandoned.

[51] Int. Cl.[5] ............................................. F16L 37/28
[52] U.S. Cl. ................................. 251/149.1; 285/316; 285/317
[58] Field of Search ............... 137/329.1, 329.2, 329.3, 137/329.4, 360, 614.12, 614.13, 801, 359; 251/149.1, 149.6; 285/305, 314, 31, 316, 317, 319

[56] References Cited

U.S. PATENT DOCUMENTS

| 1,226,175 | 5/1917 | Bibleheiser, Jr. | 137/329.1 |
|---|---|---|---|
| 1,286,160 | 6/1918 | Sammons | 137/329.1 |
| 1,383,272 | 6/1921 | Woore | 137/329.1 |
| 1,551,758 | 9/1925 | Lehr | 137/329.3 |
| 2,135,221 | 11/1938 | Scheiwer | 251/149.1 |
| 2,318,965 | 5/1943 | Parker et al. | 251/149.1 |
| 2,893,421 | 7/1959 | Brown et al. | 137/329.3 |
| 2,896,222 | 7/1959 | Freibott | 137/359 |
| 3,331,386 | 7/1967 | Politz | 137/360 |
| 3,376,888 | 4/1968 | Anthony | 137/359 |
| 3,715,099 | 2/1973 | Shendure | 251/149.1 |
| 4,548,224 | 10/1985 | McLaughlin | 137/801 |
| 4,660,803 | 4/1987 | Johnston et al. | 251/149.1 |
| 4,678,002 | 7/1987 | Valley | 137/801 |
| 4,903,942 | 2/1990 | Licciardello et al. | 251/149.1 |

FOREIGN PATENT DOCUMENTS

| 689508 | 6/1964 | Canada | 251/149.1 |
|---|---|---|---|
| 823379 | 12/1951 | Fed. Rep. of Germany | 137/329.1 |
| 832228 | 2/1952 | Fed. Rep. of Germany | 137/329.1 |
| 418273 | 2/1947 | Italy | 137/329.1 |
| 428791 | 1/1948 | Italy | 137/329.1 |

Primary Examiner—George L. Walton

[57] ABSTRACT

A quick release coupling comprises a female member, a spring biased locking collar slidingly mounted over the female member, and a male member insertable into a central bore in the receiving element of the female member. The male member has an annular groove formed at a predetermined position around the insertion end thereof. The receiving element of the female member has four axially aligned, resilient cantilevers formed in the peripheral wall thereof surrounding the central bore. Each cantilever has an enlarged lug on the terminal end thereof which projects radially inwards from the inner periphery of the bore. The male member can be inserted into the female member by first pulling the collar to a rear position. During the insertion of the male member into the bore, a beveled rim on the insertion end engages the lugs to effect the outward flexure of the cantilevers. The cantilevers subsequently recover to intromit the lugs into the annular groove of the male member. Protruding stops on the inner periphery of the collar, when the latter is released to a forward position, abut the backs of the lugs to prevent disengagement from the annular recess so as to secure the male and female members together.

4 Claims, 3 Drawing Sheets

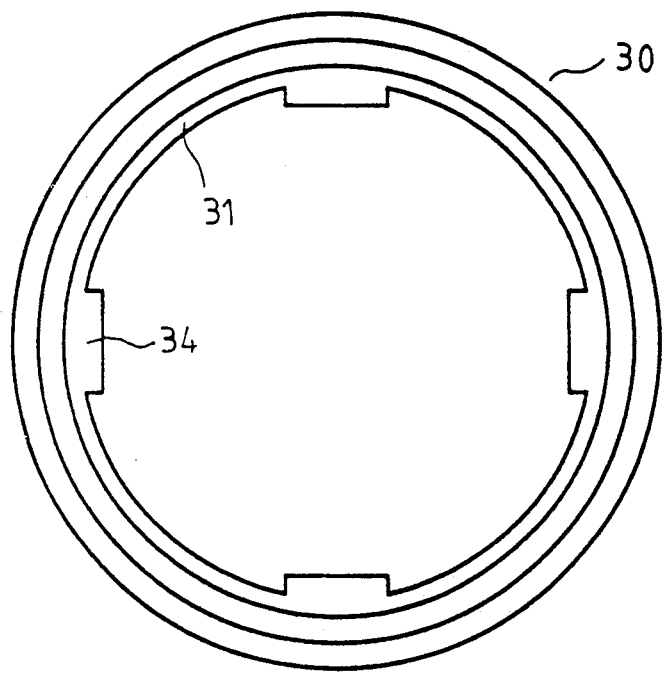
F I G. 3b
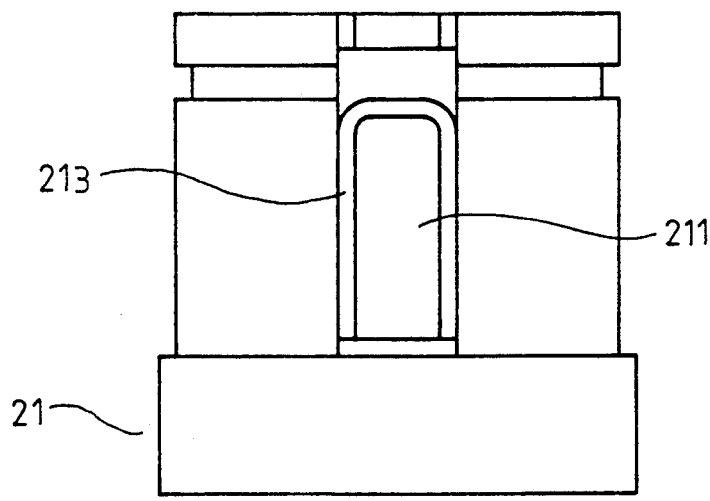
F I G. 3a

FAUCET ASSEMBLY

CROSS-REFERENCES TO RELATED APPLICATIONS

This application is a continuation-in-part of application Ser. No. 07/819,486, filed Jan. 10, 1992, now abandoned.

BACKGROUND OF THE PRESENT INVENTION

The present invention relates to a fluid coupling, and more particularly to a quick releasing and attaching fluid coupling of simple construction and having unitarily formed members that are amenable to rapid and economic manufacture.

Quick release fluid couplings have a long history and many vaned designs are known from the prior art. In particular, one popular generic category utilizes a mate member having an annular recess formed around an insertion end thereof, and a female member having a sliding collar disposed therearound which engages displaceable detent means positioned radially between the male and female members. In earlier designs, the detent means often comprised a set of spheres positioned through apertures the female member wherein the collar maintained their engagement with the recess of the male member when in a lock position. More recently, designs employ male and female members which are unitarily formed from molded plastics so as to facilitate their manufacture and take advantage of the lightweight and corrosion resistance of these materials. Generally, in this latter type of coupling a resilient detent means is provided on either the female member or collar which can be flexed either into or out of engagement with a mating surface on the male member.

The coupling of the present invention is also of this generic type. However, the corresponding members employed in the coupling are of a far simpler geometry. Tooling costs for the requisite molds would hence be accordingly reduced and dimensional tolerances would be less stringent. Furthermore, the simpler geometry and operation of the actuating elements provides a more reliable coupling that is less prone to wear or jamming.

SUMMARY OF THE PRESENT INVENTION

A quick releasing and attaching fluid coupling in accordance with the present invention comprises a hollow female member and a hollow male member insertable into the female member. The female member has a tubular receiving portion on one end thereof which carries resilient, axially aligned cantilevers on the peripheral wall thereof. Each cantilever has a lug provided on the terminal end thereof which projects into the bore of the female member. A sliding collar is mounted over the female member which has a stop surface on the inner periphery thereof for abutment against the outer periphery of the cantilevers when the collar is in a forward position. The stop surface is disengaged from the cantilevers when in a rear position so as to allow their outward flexure. The tubular male member has a first cam surface defined by a beveled peripheral rim on a terminal end thereof which engages the lugs of the cantilevers when the male member is inserted into the bore of the receiving portion so as to effect the outward flexure of the cantilevers. The cantilevers subsequently recover so as to intromit the lugs into an annular recess formed around a periphery of the male member, The male member is releasably secured to the female member by bringing the collar back to the front position thereon wherein the stop surface prevents the flexure of the cantilevers and retains the lugs in engagement with the annular recess of the male member.

A first object of the present invention is to provide a quick releasing and attaching fluid coupling as characterized wherein all members thereof are unitarily formed by molding of a synthetic material.

A further object of the present invention is to provide a quick releasing and attaching fluid coupling as characterized which further includes a valve means in the female member for preventing egress from the female member when the male member is detached therefrom.

A more thorough understanding of the actualization of these and other objects and advantages of the present invention will be attained by reference to a detailed description of a preferred embodiment thereof, provided below along with accompanying drawings.

BRIEF DESCRIPTION OF THE DRAWINGS

FIG. 3a is a side view of a receiving element of the female member.

FIG. 3b is an end-on view of the receiving end portion.

DETAILED DESCRIPTION OF THE PREFERRED EMBODIMENT

Figure 1:
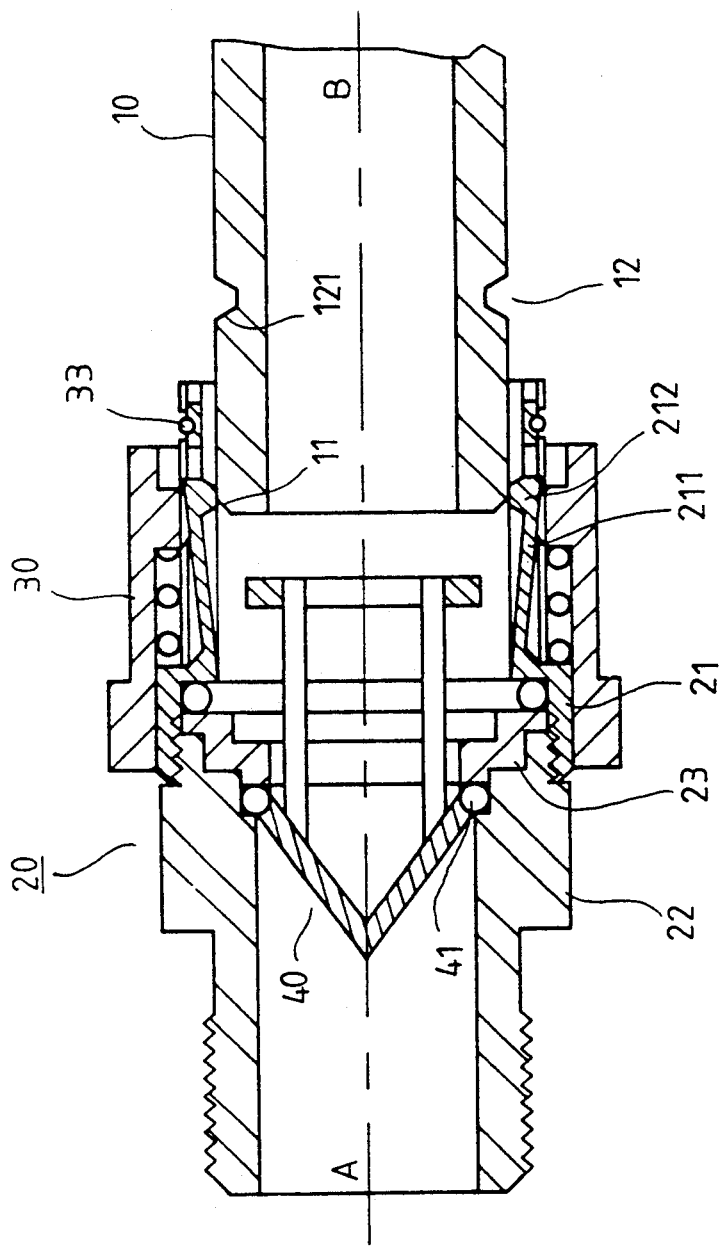
FIG. 1 is a sectional view showing a female member of the fluid coupling with a sliding collar thereon in a rear position, and a male member thereof partially inserted into the bore of the female member.
Figure 2:
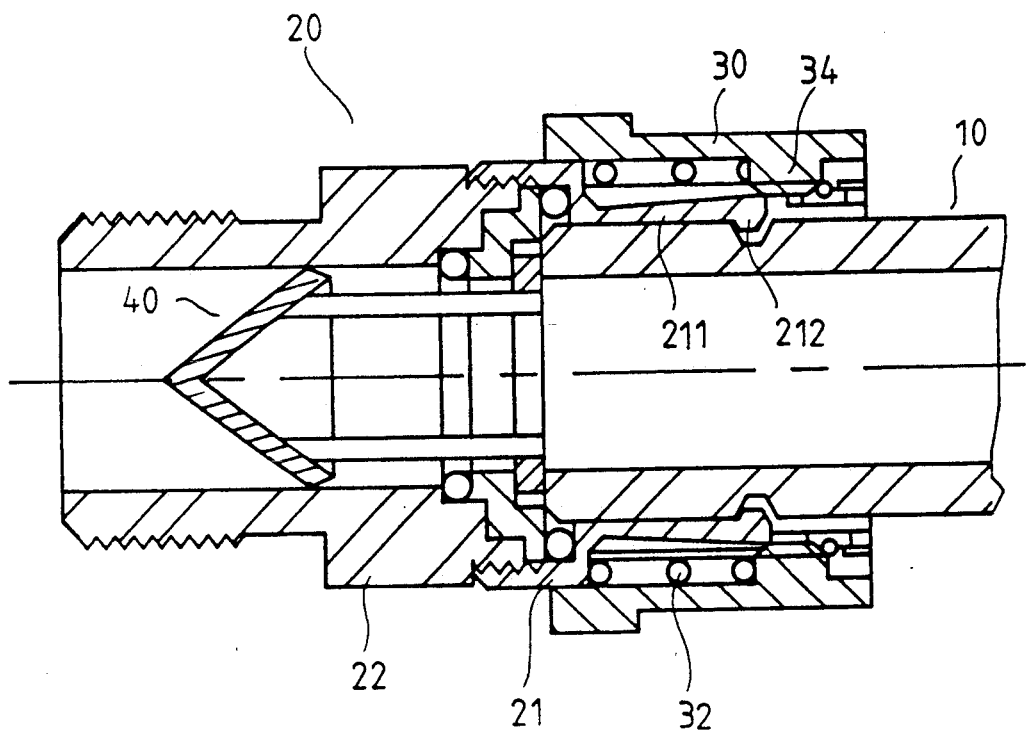
FIG. 2 is a sectional view showing the male member fully inserted in the female member with the collar in a forward locking position.

Referring to FIGS. 1 and 2 of the drawings, a quick releasing and attaching fluid coupling comprises a tubular male member 10 which can be a unitary portion of a faucet or hose coupling, a tubular female member 20 having a receiving element 21, and a locking collar 30 slidingly retained over the receiving element.

The receiving element 21 is threadedly secured to a rear coupling 22 of the female member which has external threads on its free end for coupling to a pipe or the like. A valve member 40 is slidingly retained within the fluid conduit A defined within the female member and normally rests against a packing ring 41 secured between rear coupling 22 and an inner flange 23 adjacent the receiving element.

Male member 10 has a beveled outer rim on the terminal end thereof which defines a first cam surface 11, and an annular recess 12 formed at a predetermined position around the outer periphery thereof. An oblique forward wall of the recess, nearest first cam surface 11, defines a second cam surface 121.

The tubular receiving element 21 has a stepped diameter outer periphery with a rear section adjacent the coupling 22 that is of larger diameter than a forward section. Four resilient axially aligned, cantilever elements 211 are formed in the peripheral wall of the lesser diameter forward section at equally spaced radial positions therearound, as shown in FIG. 3a. Each cantilever element 211 has a locking lug 212 on the terminal end thereof as shown in FIG. 3b, which protrudes radially inwards into the central bore of the receiving element. Each cantilever is disposed within a corresponding elongate, recessed channel 213 formed along the peripheral wall of the front section.

Collar 30 has an inwardly projecting annular flange 31 in a forward portion of the inner periphery thereof Whereas a rear portion of the inner periphery is in sliding contact with the rear section of receiving element 21 so as to define a space between the collar and the forward section of the receiving element. A compression spring 32 disposed within the space acts against flange 31 to bias collar 30 forwards. The collar is retained on the female member by a split ring 33 attached to a circumferential groove near the forward end of the receiving element, that is normally in abutment with a forward side of the flange. Four protruding stops 34 on the flange project radially inwards and ride within respective channels 213 in the receiving element.

In operation, the collar 30 is normally in a forward position, as in FIG. 2, wherein the stops 34 are in position over corresponding lugs 212 and in abutment therewith so as to prevent any outward flexure of the cantilever elements. As such, male member 10 can not be inserted into the bore of the female member which is blocked by the inwardly projecting lugs. The male member can be inserted into the bore of the female member by first retracting collar 30 rearwards so that stops 34 are no longer positioned over the lugs 212, as in FIG. 1. Upon insertion, the first cam surface 11 on the male member engages a forward surface on each lug 212 to effect the outward flexure of the cantilever elements so as to allow its entry. At the end of the male members travel, the cantilever elements 211 recover so as to intromit the lugs into recess 12. The collar is subsequently released to secure the attachment of the male and female members, as in FIG. 2, wherein the stops 34 return to their forward positions over the lugs preventing disengagement of the lugs from recess 12. The male member can be disconnected from the female member by similarly retracting the collar to a rearward position and subsequently extracting or allowing the ejection of the male member, wherein the second cam surface 121 engages a rear surface of the lugs 212 to effect the outward flexure of the cantilevers and hence the displacement of the lugs from recess 12.

The insertion of the male member into the bore of the female member concomitantly opens valve member 40, wherein the terminal end of member 10 comes into abutment with the outer end of the valve member and forces the member inwards within the conduit of the female member and away from packing ring 41 to allow fluid flow through the conduits of the female member and male member. The valve member abuts the packing ring when the male member is separated from the female member so as to prevent fluid egress therefrom.

The male member 10, female member 20, and collar 30 in the present embodiment were formed from a polyacetal resin by injection molding, though other synthetic compounds could also have been employed in their manufacture in accordance with design criteria.

Note that the specificities related to in the above description should not be interpreted as being limitative of the present invention but rather as being merely exemplary of a preferred embodiment thereof, with many variations and modifications thereto being readily accomplished by a person of average skill in the art. For example, the stops 34 on the collar 30 can be dispensed with by using the cylindrical inner periphery thereof as the stop surface for a cooperating set of cantilevers. Further, in lieu of bias spring 32 a suitable detent means such as an interlocking or snap engaging pair of mating surfaces on the corresponding members could also be used to position the collar. Accordingly, the actual spirit and scope of the present invention should instead be determined from the appended claims and their legal equivalents.

I claim;

1. A quick releasing and attaching fluid coupling comprising:

a hollow female member defining a fluid conduit therein and having a receiving portion with a generally cylindrical bore;

at least one resilient cantilever formed unitarily in a peripheral wall of the receiving portion and secured to said female member at one end thereof and being axially aligned with the bore thereof, said at least one cantilever having a lug on the other end thereof projecting radially inwards so as to extend into the bore of said female member, said at least one resilient cantilever defines an extended portion of the cylindrical bore;

a hollow male member defining a fluid conduit therein and having a first end portion for insertion into the bore of said female member wherein the fluid conduit of said male member is in communication with the fluid conduit of said female member, said male member having;

a) a cam surface on the terminal end of the first end portion thereof for engaging said lug when said male member is inserted into said female member so as to effect the outward radial flexure of said at least one cantilever;

b) an annular recess formed at a predetermined position around an outer periphery of the first end portion thereof for receiving said lug of said at least one cantilever wherein the outwardly flexed said at least one cantilever recovers so as to intromit said lug into said annular recess, said annular recess defining a cam surface therein for engaging said lug so as to effect the outward radial flexure of said at least one cantilever when said male member is retracted from said female member;

a sleeve member slidingly mounted over and along the entire length of said at least one resilient cantilever, said sleeve member having at least one stop surface on an inner periphery thereof for abutment with an outer periphery of the other end of said at least one cantilever so as to prevent the outward radial displacement of said lug thereon from said recess when said sleeve member is in a first position on said female member;

a positioning means for maintaining said slide member in said first position on said female member disposed between and around a portion of said at least one resilient cantilever and a portion of said sleeve member adjacent said at least one stop;

whereby, said male member can be releasably secured to said female member by displacing said sleeve member along said at least one resilient cantilever into a distal position relative to said lug and said recess engagement so as to allow the outward radial displacement of said lug, inserting the first end portion of said male member into said female member away from said recess, and thereafter, and returning said sleeve member to said first position.

2. A quick release fluid coupling according to claim 1, wherein said at least one stop surface in said sleeve member projects radially inwards from an inner periphery thereof and said female member has at least one axially aligned groove formed on an outer periphery thereof for guiding said at least one groove.

3. A quick release fluid coupling according to claim 2, further including a valve means in said female member actuated by the insertion of said male member therein for allowing fluid flow through the conduits of said male member and said female member when said male member is inserted therein while inhibiting fluid egress from said female member when said male member is detached therefrom.

4. A quick release fluid coupling according to claim 3, wherein said positioning means includes a a resilient biasing means for urging said sleeve member towards said first position.

* * * * *